(12) United States Patent
Fan et al.

(10) Patent No.: US 10,425,515 B2
(45) Date of Patent: Sep. 24, 2019

(54) MOBILE TERMINAL AND ELECTRONIC APPARATUS

(71) Applicant: GUANGDONG OPPO MOBILE TELECOMMUNICATIONS CORP., LTD., Dongguan, Guangdong (CN)

(72) Inventors: Xiaoyu Fan, Dongguan (CN); Zhengshan Zhang, Dongguan (CN)

(73) Assignee: GUANGDONG OPPO MOBILE TELECOMMUNICATIONS CORP., LTD, Dongguan (CN)

( * ) Notice: Subject to any disclaimer, the term of this patent is extended or adjusted under 35 U.S.C. 154(b) by 0 days.

(21) Appl. No.: 16/214,926

(22) Filed: Dec. 10, 2018

(65) Prior Publication Data

US 2019/0253541 A1  Aug. 15, 2019

(30) Foreign Application Priority Data

Feb. 9, 2018  (CN) .................... 2018 2 0236507 U

(51) Int. Cl.
*H04N 5/225* (2006.01)
*H04M 1/02* (2006.01)
*H04N 1/00* (2006.01)

(52) U.S. Cl.
CPC ....... *H04M 1/0264* (2013.01); *H04M 1/0237* (2013.01); *H04M 1/0266* (2013.01); *H04N 1/00307* (2013.01)

(58) Field of Classification Search
None
See application file for complete search history.

(56) References Cited

U.S. PATENT DOCUMENTS

| 8,922,625 | B2 * | 12/2014 | Kim | ................... G03B 35/10 348/47 |
| 9,071,820 | B2 * | 6/2015 | Kim | ................... H04N 5/2252 |
| 9,736,383 | B2 * | 8/2017 | Evans, V | ............. H04N 5/2254 |

(Continued)

FOREIGN PATENT DOCUMENTS

| CN | 102957763 A | 3/2013 |
| CN | 105100312 A | 11/2015 |

(Continued)

OTHER PUBLICATIONS

International search report and written opinion, PCT/CN2018/119209 dated Feb. 27, 2019(10 pages).

(Continued)

*Primary Examiner* — Tuan A Tran
(74) *Attorney, Agent, or Firm* — Ladas & Parry, LLP

(57) ABSTRACT

A mobile terminal, which may include a left side face, a right side face, a front side face, a rear side face, a top side face, and a bottom side face. A groove may be defined in the mobile terminal, and penetrate the left side face and the right side face. The mobile terminal may include a slidable device, a first display screen, a first camera, and a second camera. The first display screen may be arranged on the front side face, and the first camera and the second camera may be arranged on the slidable device. When the slidable device slides into the groove, the first camera is blocked and the second camera may be exposed; when the slidable device slides out of the groove, the first camera and the second camera may be both exposed.

20 Claims, 12 Drawing Sheets

(56) References Cited

U.S. PATENT DOCUMENTS

| | | | |
|---|---|---|---|
| 9,762,781 B2* | 9/2017 | Evans, V | H04N 5/2252 |
| 9,998,642 B2* | 6/2018 | Evans, V | H04N 5/2252 |
| 10,044,920 B2* | 8/2018 | Brand | H04N 5/232 |
| 10,070,030 B2* | 9/2018 | Evans, V | H04N 5/2254 |
| 10,284,697 B2* | 5/2019 | Yin | H04M 1/02 |
| 2003/0078082 A1 | 4/2003 | Su | |
| 2005/0014527 A1* | 1/2005 | Chambers | H04M 1/0264 |
| | | | 455/556.1 |
| 2006/0197863 A1* | 9/2006 | Kim | H04M 1/0264 |
| | | | 348/335 |
| 2008/0061437 A1* | 3/2008 | Kohara | H01L 23/13 |
| | | | 257/738 |
| 2009/0203398 A1 | 8/2009 | Griffin | |
| 2015/0189175 A1* | 7/2015 | Fan | H04N 5/2251 |
| | | | 348/37 |
| 2017/0163889 A1* | 6/2017 | Evans, V | G02B 13/06 |
| 2017/0230073 A1 | 8/2017 | Youn et al. | |
| 2019/0033926 A1* | 1/2019 | Huang | G06F 1/1686 |

FOREIGN PATENT DOCUMENTS

| | | |
|---|---|---|
| CN | 106790833 A | 5/2017 |
| CN | 106899722 A | 6/2017 |
| CN | 207926666 U | 9/2018 |
| EP | 1558007 A1 | 7/2005 |
| EP | 3163845 A1 | 5/2017 |
| EP | 3255867 A1 | 12/2017 |

OTHER PUBLICATIONS

European search report, EP18210834, dated Jul. 1, 2019 (8 pages).

\* cited by examiner

MOBILE TERMINAL AND ELECTRONIC APPARATUS

CROSS-REFERENCE TO RELATED APPLICATIONS

This application claims priorities to Chinese Patent Application No. 201820236507.0, filed on Feb. 9, 2018, the contents of which are herein incorporated by reference in their entireties.

FIELD

The described embodiments relate to electronic technology, and more particularly, to a mobile terminal and an electronic apparatus.

BACKGROUND

Currently, in order to obtain a better user experience, a requirement of users for a large screen display of mobile phones becomes more and more urgent. However, because the mobile phone usually needs to be provided with devices such as a camera on its front face, it limits the layout space of the display. Therefore, a screen-to-body ratio of the mobile phone is difficult to be increased.

SUMMARY

A mobile terminal includes a right side face, a left side face, a front side face, a rear side face, a top side face, and a bottom side face. The left side face is arranged opposite to the right side face. The front side face is arranged opposite to the rear side face. The front side face is coupled between the left side face and the right side face. The rear side face is coupled between the left side face and the right side face. The top side face is arranged opposite to the bottom side face. The top side face is coupled between the left side face and the right side face, and is coupled between the front side face and the rear side face. The bottom side face is coupled between the left side face and the right side face. A groove is defined in the mobile terminal. The groove is recessed from the top side face toward the bottom side face. The groove penetrates the left side face and the right side face. The groove extends to the rear side face. The mobile terminal further includes a slidable device configured to slide out of the groove or into the groove. The slidable device includes a left side wall, a right side wall, a front side wall, a rear side wall, and a top side wall. The left side wall is arranged opposite to the right side wall. The front side wall is coupled between the left side wall and the right side wall. The rear side wall is coupled between the left side wall and the right side wall. The top side wall is coupled between the left side wall and the right side wall, and is coupled between the front side wall and the rear side wall. The mobile terminal further includes a first display screen, a first camera, and a second camera. The first display screen is arranged on the front side face. The first camera and the second camera are arranged on the slidable device. An orientation of an image capturing face of the first camera is consistent with an orientation of the front side wall. An orientation of an image capturing face of the second camera is consistent with an orientation of the rear side wall. When the slidable device slides into the groove with the first camera and the second camera, the top side wall becomes a part of the top side face, and the left side wall becomes a part of the left side face, and the right side wall becomes a part of the right side face, and the rear side wall becomes a part of the rear side face, and the image capturing face of the first camera is blocked, and the image capturing face of the second camera is exposed. When the slidable device slides out of the groove with the first camera and the second camera, the image capturing face of the first camera and the image capturing face of the second camera are both exposed.

A mobile terminal includes a front shell having a first top edge, a back shell opposite to the front shell and having a second top edge lower than the first top edge, a screen mounted on the front shell, a frame including a pair of spaced and parallel walls engaged with the front and back shells to enclose a chamber. Each of the walls has a top lower than the first and second top edges. A partition wall is connected the walls. The front shell, the back shell, and the partition wall cooperatively define a storage space. The mobile terminal further includes a slidable device having a front and a rear opposite to the front. The slidable device includes a first camera on the front and a second camera on the rear. The slidable device is configured to move between a first position at which the slidable device extends out of the storage space and a second position at which the slidable device partly retracts into the storage space. When the slidable device is at the first position, the first and second cameras are exposed out of the storage space. When the slidable device is at the second position, the first camera is received in the storage space and the rear with the second camera is exposed, and the rear of the slidable device engages with the second top edge of the back shell.

An electronic apparatus includes a front shell; a back shell including an upper portion and a lower portion, a screen mounted on the front shell, a frame including a pair of spaced and parallel walls engaged with the front shell and the lower portion of the back shell to enclose a chamber. Each of the walls has a top lower than tops of the front shell and the lower portion of the back shell. A partition wall is connected the walls. The front shell, the lower portion, and the partition wall cooperatively define a storage space. The electronic apparatus further includes a slidable device having a front and a rear opposite to the front. The upper portion of the back shell is mounted on the rear of the slidable device. The slidable device includes a first camera on the front and a second camera on upper portion. The slidable device is configured to move between a first position at which the slidable device extends out of the storage space and a second position at which the slidable device partly retracts into the storage space with the rear exposed. When the slidable device is at the first position, the first and second cameras are exposed out of the storage space. When the slidable device is at the second position, the first camera is received in the storage space and the second camera is exposed, and the upper portion engages with the lower portion of the back shell.

BRIEF DESCRIPTION OF THE DRAWINGS

In order to make the technical solution described in the embodiments of the present disclosure more clear, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

Figure 1:
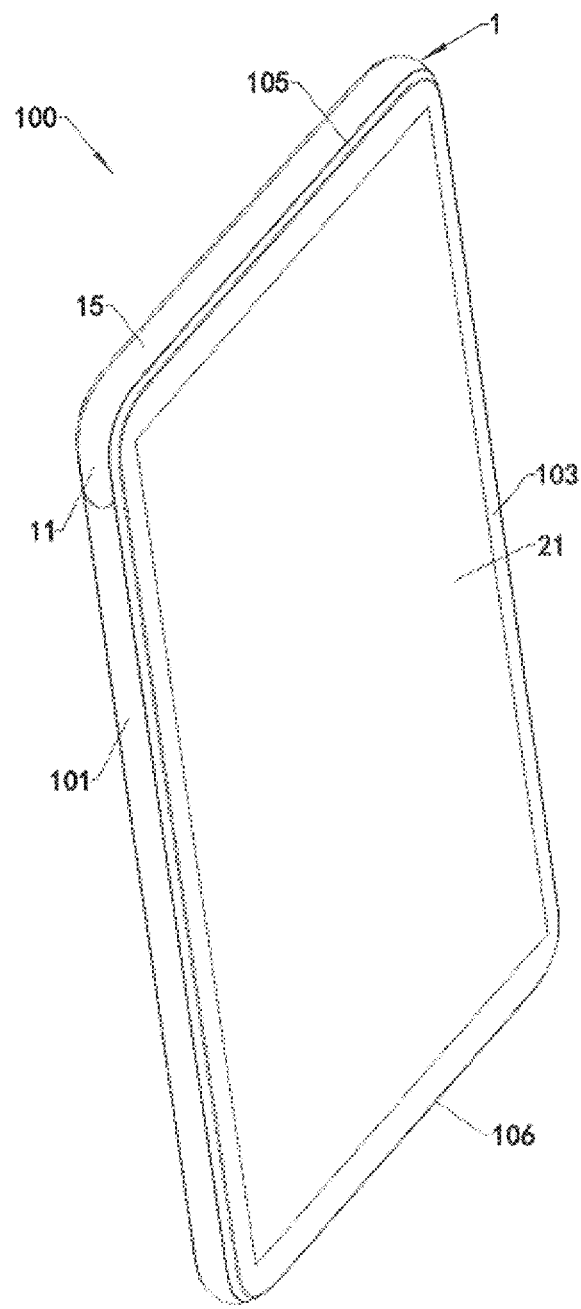
FIG. 1 is a perspective assembly view of a mobile terminal in accordance with an embodiment in the present disclosure.

Embodiments of the present disclosure will be described in detail below, and examples of the embodiments will be illustrated in the accompanying drawings. The embodiments described below with reference to the drawings are illustrative and are intended to explain the present disclosure, and cannot be construed as a limitation to the present disclosure.

In the description of the present disclosure, it is to be understood that terms such as "front", "rear", "left", "right", "top", "bottom", "inner", "outer", and the like, refer to the orientations and locational relations illustrated in the accompanying drawings. Thus, these terms used here are only for describing the present disclosure and for describing in a simple manner, and are not intended to indicate or imply that the device or the elements are disposed to locate at the specific directions or are structured and performed in the specific directions, which could not to be understood as limiting the present disclosure.

In the present disclosure, unless specified or limited, otherwise, terms "mounted", "connected", "coupled", "arranged", and the like are used in a broad sense, and may include, for example, fixed connections, detachable connections, or integral connections; may also be mechanical or electrical connections; may also be direct connections or indirect connections via intervening structures; may also be inner communications of two elements, as can be understood by one skilled in the art depending on specific contexts.

In addition, terms such as "first", "second", and the like are used herein for purposes of description, and are not intended to indicate or imply relative importance or significance or to imply the number of indicated technical features. Thus, the feature defined with "first", "second", and the like may include one or more of such a feature. In the description of the present disclosure, "a plurality of" means two or more, such as two, three, and the like, unless specified otherwise.

The electronic apparatus may include intelligent devices such as tablet PCs, mobile terminals, cameras, personal computers, laptops, in-vehicle devices, wearable equipment, and the like. It should be understood that "electronic apparatus" in the present disclosure may include, but be not limited to an apparatus receiving/transmitting communication signals via wired connection, for example, public switched telephone network (PSTN), digital subscriber line (DSL), digital cable, electric cable and/or another data connection/network, and/or cellular network, Wireless Area Networks (WLAN), digital television network such as DVB-H (Digital Video Broadcasting Handheld) network, satellite network, AM-FM broadcast transmitter/and/or another communication terminal of wireless interface. The electronic apparatus may also include a satellite or cellular telephone, a personal communication system terminal with cellular radio telephone and data processing, facsimile and data communication, beeper, or other electronic apparatuses with a transceiver.

Referring to FIGS. 1 to 6, the present disclosure provides a mobile terminal 100. The mobile terminal 100 may include a left side face 101, a right side face 102, a front side face 103, a rear side face 104, a top side face 105, and a bottom side face 106. The left side face 101 may be arranged opposite to the right side face 102. The front side face 103 may be arranged opposite to the rear side face 104. The front side face 103 may be coupled between the left side face 101 and the right side face 102. The rear side face 104 may be coupled between the left side face 101 and the right side face 102. The top side face 105 may be arranged opposite to the bottom side face 106. The top side face 105 may be coupled between the left side face 101 and the right side face 102, and the top side face 105 may be coupled between the front side face 103 and the rear side face 104. The bottom side face 106 may be coupled between the left side face 101 and the right side face 102, and the bottom side face 106 may be coupled between the front side face 103 and the rear side face 104.

A groove 10 may be defined in the mobile terminal 100. The groove 10 may be recessed from the top side face 105 toward the bottom side face 106. The groove 10 may penetrate the left side face 101 and the right side face 102. The groove 10 may extend to the rear side face 104.

The mobile terminal 100 may include a slidable device 1. The slidable device 1 may be configured to slide out of the groove 10 or into the groove 10. The slidable device 1 may include a left side wall 11, a right side wall 12, a front side wall 13, a rear side wall 14, and a top side wall 15. The left side wall 11 may be arranged opposite to the right side wall 12. The front side wall 13 may be coupled between the left side wall 11 and the right side wall 12. The rear side wall 14 may be coupled between the left side wall 11 and the right side wall 12. The top side wall 15 may be coupled between the left side wall 11 and the right side wall 12, and the top side wall 15 may be coupled between the front side wall 13 and the rear side wall 14.

The mobile terminal 100 may include a first display screen 21, a first camera 31, and a second camera 32. The first display screen 21 may be arranged on the front side face 103. The first camera 31 and the second camera 32 may be arranged on the slidable device 1. An orientation of an image capturing face of the first camera 31 may be consistent with an orientation of the front side wall 13. An orientation of an image capturing face of the second camera 32 may be consistent with an orientation of the rear side wall 104.

When the slidable device 1 slides into the groove 10 with the first camera 31 and the second camera 32, the top side wall 11 may become a part of the top side face 101; the left side wall 11 may become a part of the left side face 101; the right side wall 12 may become a part of the right side face 102; and the rear side wall 14 may become a part of the rear side face 104; the image capturing face of the first camera 31 may be blocked, and the image capturing face of the second camera 32 may be exposed. At this time, the first camera 31 may not capture any image, and the second camera 32 may capture images. When the slidable device 1 slides out of the groove 10 with the first camera 31 and the second camera 32, the image capturing face of the first camera 31 and the image capturing face of the second camera 32 may be both exposed. At this time, both the first camera 31 and the second camera 32 may not capture images.

In this embodiment, because the slidable device 1 may slide out of the groove 10 or into the groove 10 with the first camera 31, the slidable device 1 may slide out of the groove 10 with the first camera 31 to shoot when it is necessary to shoot; when it is not necessary to shoot, the slidable device 1 may slide into the groove 10 with the first camera 31, so the first camera 31 may not need to occupy a space of the front side face 103 of the mobile terminal 100. The first display screen 21 may be arranged as large as possible on the front side face 103 of the mobile terminal 100, so that the screen-to-body ratio of the mobile terminal 100 may be increased.

For example, the screen-to-body ratio of the mobile terminal 100 may be as high as 85% or even 95%. The screen-to-body ratio means that in a vertical plane of a thickness direction of the mobile terminal 100, a ratio of a display area of a screen of the mobile terminal 100 (such as the first display screen 21) to a projected area of the entire mobile terminal 100.

In this embodiment, when it is not necessary to use the first camera 31, the first camera 31 may be stored into the mobile terminal 100 to be protected by peripheral structures. When it is necessary to use the first camera 31, the first camera 31 may be extended out of the mobile terminal 100 to shoot. Therefore, problems of wear and ash entering the first camera 31 due to exposing the first camera 31 in a long time may be avoided, and shooting quality of the first camera 31 may be ensured.

In this embodiment, an image capturing face of the second camera 32 may have same orientation as the rear side wall 14, and the second camera 32 may directly capture images through the rear side wall 14. When the slidable device 1 slides into the groove 10, the rear side wall 14 may become the part of the rear side face 104. Therefore, in both cases that when slidable device 1 slides out of the groove 10 or into the groove 10, the second camera 32 may shoot. The usage of the mobile terminal 100 may be enriched, and the user experience may be improved. The second camera 32 may shoot without the slidable device 1 extending out of the groove 10, it may also improve the shooting speed of the mobile terminal 100 and reduce the energy consumption of the mobile terminal 100.

In this present embodiment, because the groove 10 may penetrate the left side face 101 and the right side face 102, a volume of the groove 10 may be large and easy to be processed, and the appearance and a shape of the mobile terminal 100 may be consistent. Similarly, because the volume of the groove 10 is large, a volume of the slidable device 1 that cooperates with the groove 10 may also be set larger, so that the slidable device 1 may accommodate more functional devices. An arrangement of the functional devices in the mobile terminal 100 may be made more flexible and diverse.

It should be understood that the image capturing face of the first camera 31 may be exposed, which means that the image capturing face of the first camera 31 may be not blocked by some devices of the mobile terminal 100 (such as a display screen), thereby the first camera 31 may shoot smoothly. The image capturing face of the first camera 31 may still allow a light transmitting lens or the like to be covered to achieve a protection function. The image capturing face of the second camera 32 may be exposed, which means that the image capturing face of the second camera 32 may be not blocked by some devices of the mobile terminal 100 (such as a display screen), thereby the second camera 32 may shoot smoothly. The image capturing face of the second camera 32 may still allow a light transmitting lens or the like to be covered to achieve a protection function.

The first display screen 21 may be a liquid crystal display (LCD) or an organic light-emitting diode (OLED) display.

Figure 3:
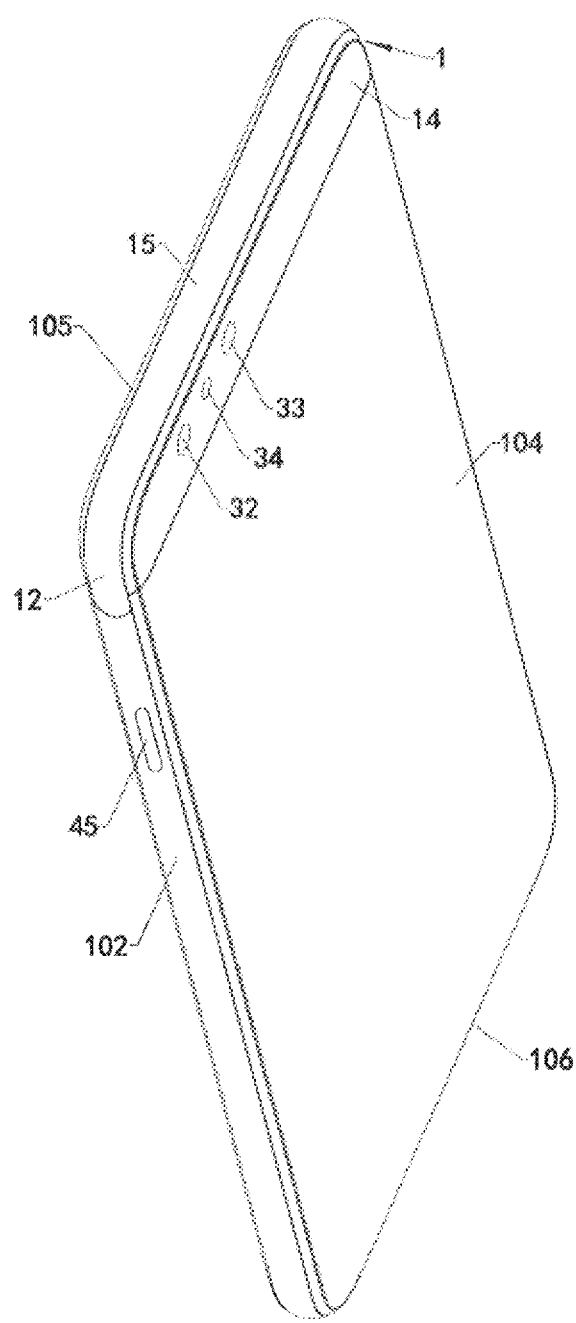
FIG. 3 is a perspective assembly view of FIG. 1, shown from another view.
Figure 4:
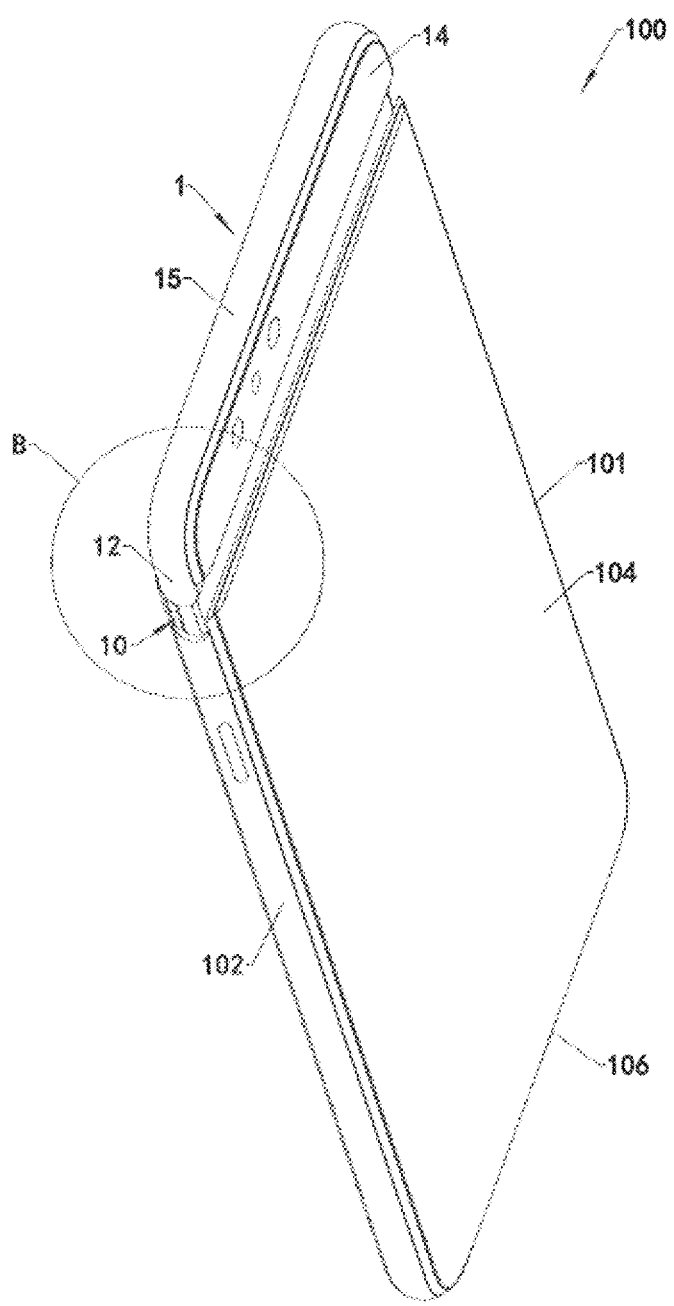
FIG. 4 is a perspective assembly view of a mobile terminal in accordance with an embodiment in the present disclosure, wherein the mobile terminal is in one state when it is used.
Figure 5:
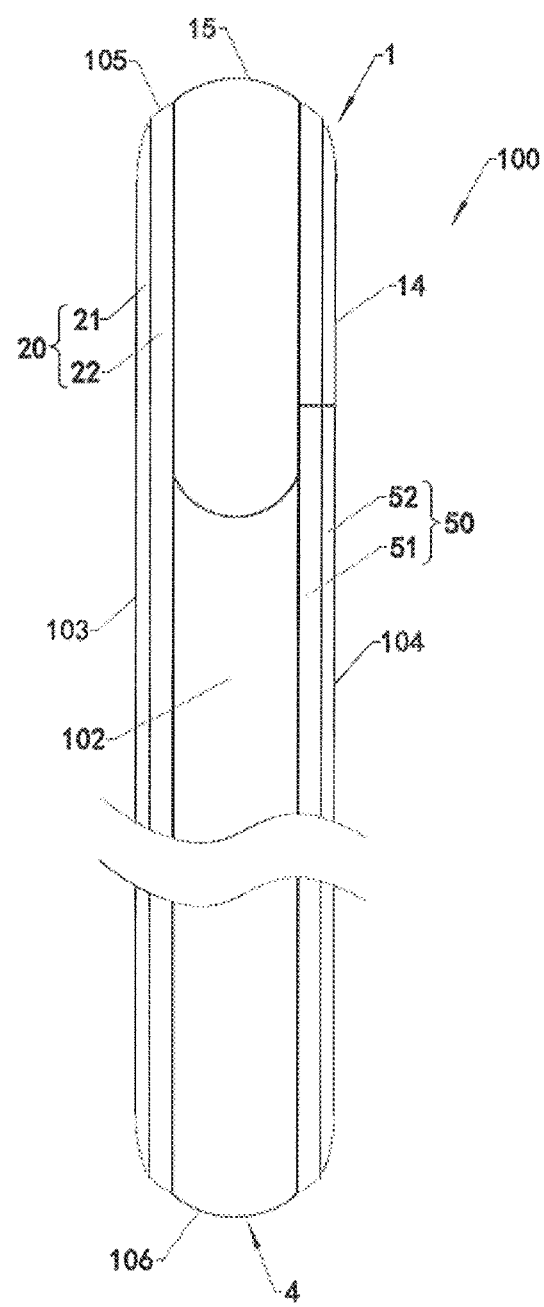
FIG. 5 is a perspective assembly of FIG. 1, shown from another view.
Figure 6:
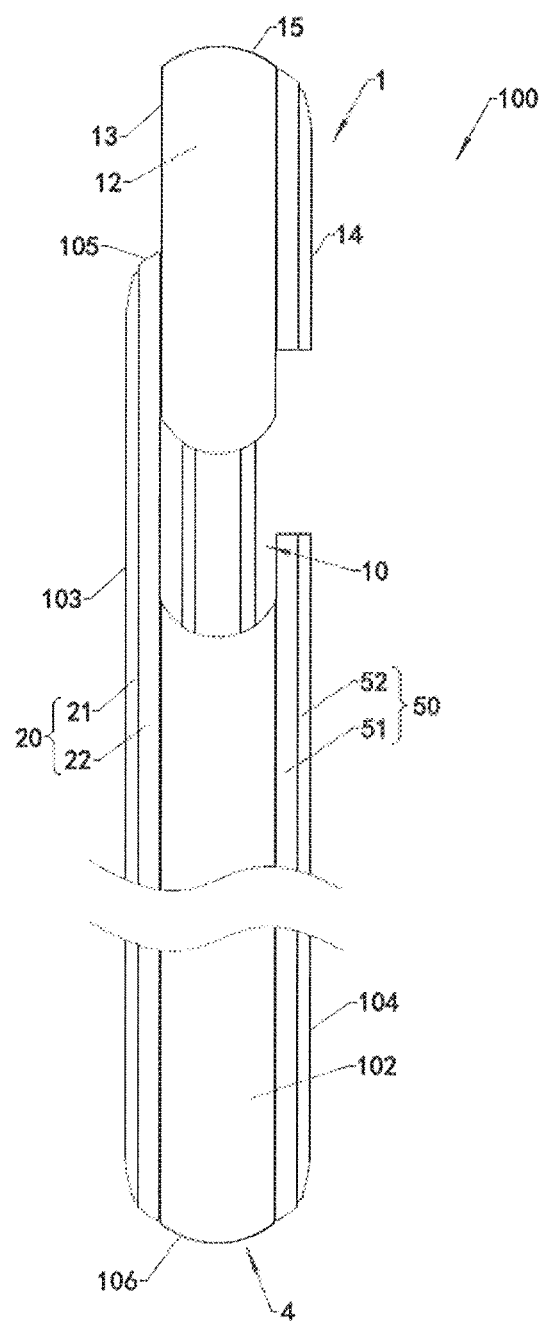
FIG. 6 is a perspective assembly of a mobile terminal in accordance with an embodiment in the present disclosure, wherein the mobile terminal is in one state when it is used.

Referring to FIG. 3, in an embodiment, the mobile terminal 100 may further include a third camera 33. The third camera may be arranged on the slidable device 1. An orientation of an image capturing face of the third camera 33 may be consistent with an orientation of the rear side wall 104. At this time, the orientation of the image capturing face of the second camera 32 and the orientation of the image capturing face of the third camera 33 may be same. The second camera 32 and the third camera 33 may cooperate with each other to meet shooing requirements such as a wide-angle shooting and a telephoto shooting.

The mobile terminal 100 may also include a flash lamp 34. A light emitting direction of the flash lamp 34 may be consistent with the orientation of the image capturing face of the second camera 32. The flash lamp 34 may be configured to fill light for the second camera 32 and the third camera 33 when the second camera 32 and the third camera 33 shoots.

Figure 2:
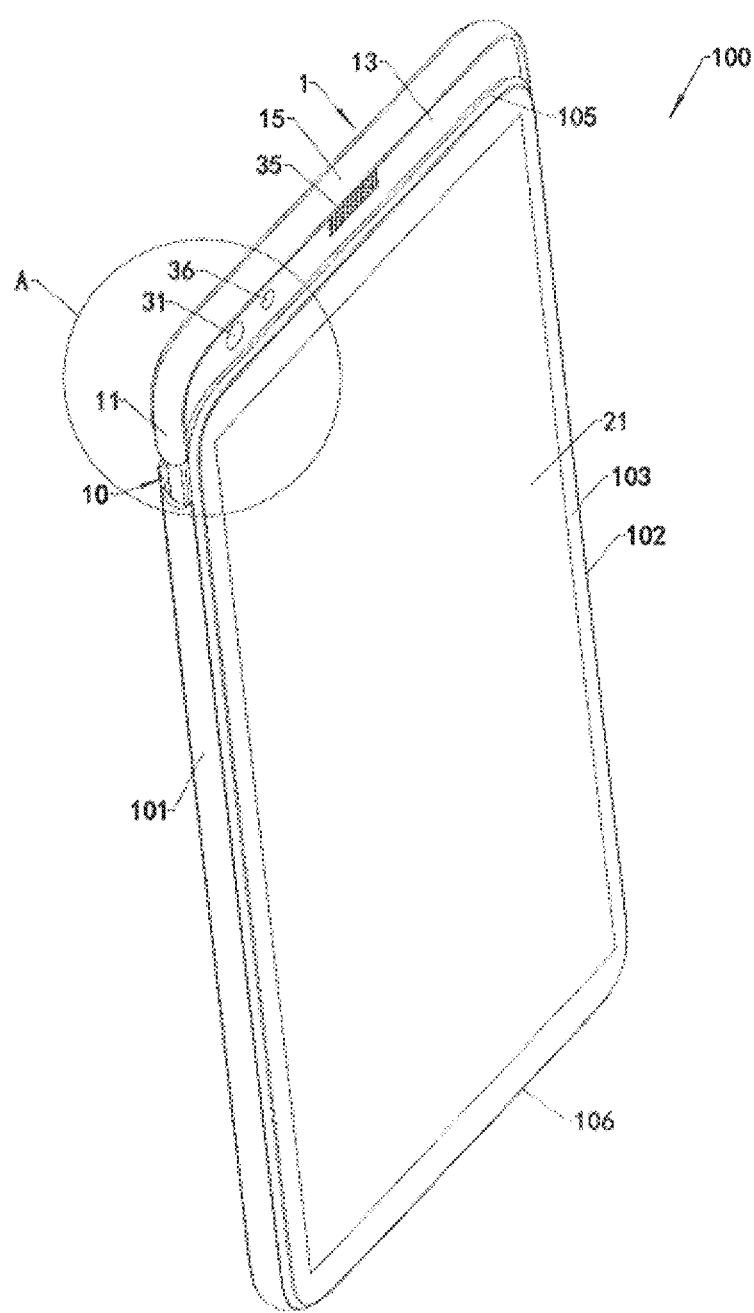
FIG. 2 is a perspective assembly view of a mobile terminal in accordance with an embodiment in the present disclosure, wherein the mobile terminal is in one state when it is used.

Referring to FIG. 2, in an embodiment, the mobile terminal 100 may further include a loudspeaker 35 (also be called a telephone receiver). The loudspeaker 35 may be arranged on the slidable device 1I, and the loudspeaker 35 may be sounded through the front side wall 13. The loudspeaker 35 may be arranged on the slidable device 1, so that the loudspeaker 35 may not need to occupy a space of the front side face of the mobile terminal 100. The first display screen may have a larger display area, so that the screen-to-body ratio of the mobile terminal 100 may be increased.

The mobile terminal 100 may further include at least one of an iris recognition module, a face recognition module, a microphone (also be called a telephone transmitter), a photoreceptor 36, and a fingerprint module. The above-mentioned functional devices (such as the photoreceptor 36, the fingerprint module, and so on) may be arranged in the slidable device 1, so that the above-mentioned functional devices may be unfolded relative to the first display screen 21 when the above-mentioned functional devices is needed, and the above-mentioned functional devices may be folded relative to the first display screen 21 when the above-mentioned functional devices is not needed. Therefore, the above-mentioned functional devices may not need to occupy a space of the front side face of the mobile terminal 100. The first display screen may have a larger display area, so that the screen-to-body ratio of the mobile terminal 100 may be increased. The above-mentioned functional devices stored into the slidable device 1 may be misaligned, to avoid an excessive thickness of the mobile terminal 100 due to an overlapping arrangement.

Referring to FIGS. 1 to 8, in an embodiment, the mobile terminal may include a display module 20, a middle frame 4, and a back cover 50 which may be sequentially stacked. A top of the middle frame 4 may be recessed relative to a top of the display module 20 and a top of the back cover 50, so that the display module 20, the middle frame 4, and the back cover 50 collectively surround to define the groove 10.

In this embodiment, the groove 10 may utilize a space in a thickness direction of the middle frame 4 as much as possible, so that the volume of the groove 10 may be large, and the slidable device 1 may have a large volume to accommodate more functional devices.

A face of the display module 20 away from the middle frame 4 may be the front side face 103. A face of the back cover 50 away from the middle frame 4 may be the rear side face 104. A left side face of the display module 20, a left side face of the middle frame 4, and a left side face of the back cover 50 may be continuous to form the left side face 101. A right side face of the display module 20, a right side face of the middle frame 4, and a right side face of the back cover 50 may be continuous to form the right side face 102. A bottom side face of the display module 20, a bottom side face of the middle frame 4, and a bottom side face of the back cover 50 may be continuous to form the bottom side face 106. When the slidable device 1 slides into the groove 10, a top side face of the display module 20 and the top side wall 15 of the slidable device 1 may be continuous to form the top side face 105.

In this embodiment, the left side face of the display module 20, the left side face of the middle frame 4, and the left side face of the back cover 50 may be continuous. Therefore, it may be possible to prevent external dust, dirt, and the like from being hidden on the left side face 101. The right side face of the display module 20, the right side face of the middle frame 4, and the right side face of the back cover 50 may be continuous. Therefore, it may be possible to prevent external dust, dirt, and the like from being hidden on the right side face 102. The bottom side face of the display module 20, the bottom side face of the middle frame 4, and the bottom side face of the back cover 50 may be continuous. Therefore, it may be possible to prevent external dust, dirt, and the like from being hidden on the bottom side face 106. When the slidable device 1 slides into the groove 10, the top side face of the display module 20 and the top side wall 15 of the slidable device 1 may be continuous. Therefore, it may be possible to prevent external dust, dirt, and the like from being hidden on the bottom side face 105.

Further, the left side face 101 may be a curved face. The right side face 102 may be a curved face. The bottom side face 106 may be a curved face. The top side face 105 may be a curved face. The front side face 103 may be a flat face. The rear side face 104 may be a flat face.

An end of the left side face 101 away from the top side face 105 may be curved. An end of the right side face 102 away from the top side face 105 may be curved. A bottom wall 10' of the groove 10 may be formed at a top end of the middle frame 4, and both ends of the bottom wall 10' of the groove 10 may be curved. The curved end of the left side face 101 may cooperate with one of the curved end of the bottom wall 10', and the curved end of the right side face 102 may cooperate with the other curved end of the bottom wall 10'.

The display module 20 may include a front case 22 and the first display screen 21. The front case 22 may be fixed on the middle frame 4. The front side face 103 may be formed on one side of the first display screen 21 away from the front case 22.

Figure 7:
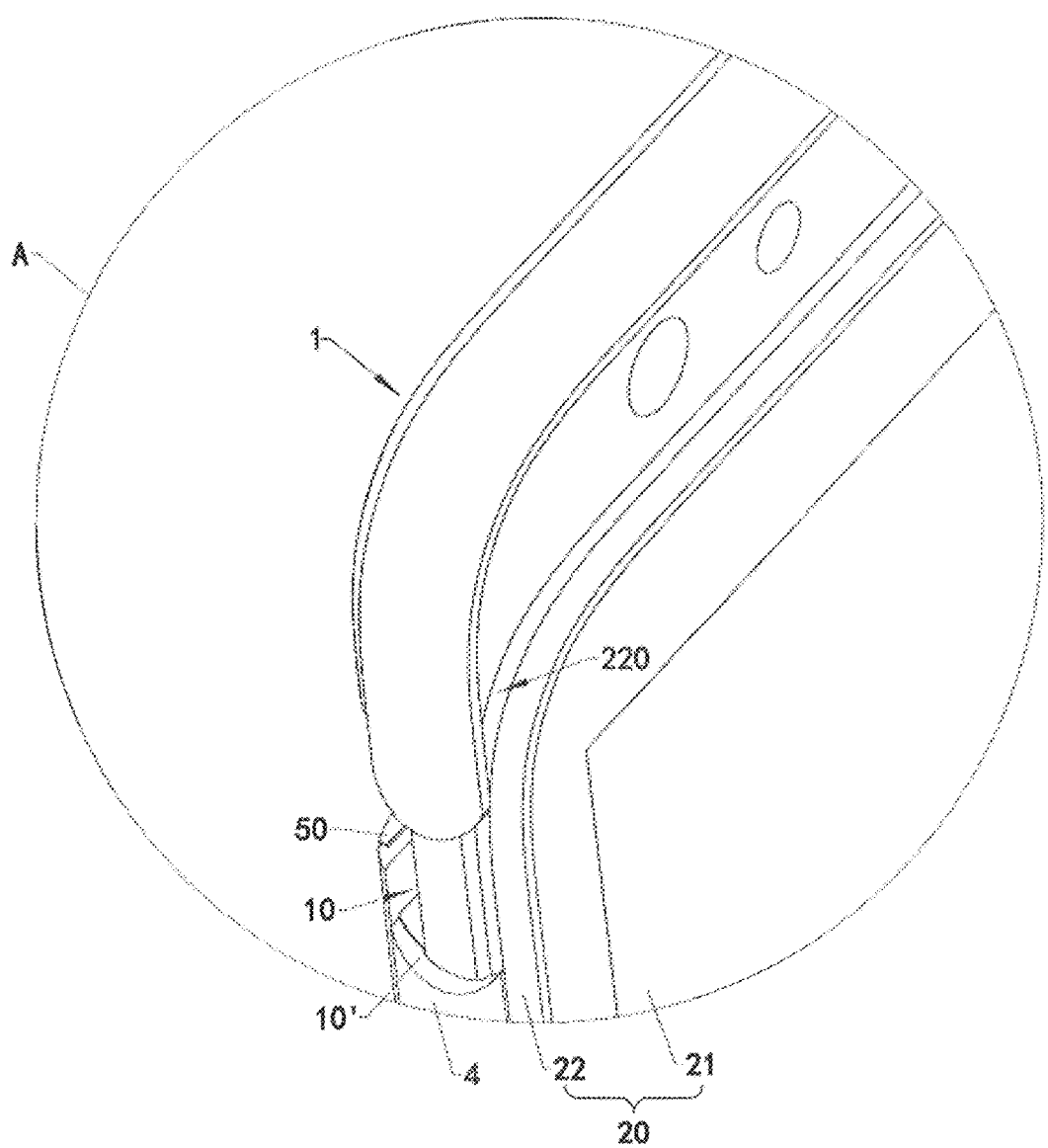
FIG. 7 is an enlarged view of structure A in FIG. 2.

Further, referring to FIG. 7, a dodging area 220 may be defined in a side of the front case 22 facing the middle frame 4. The dodging area 220 may extend to the groove 10. When the slidable device 1 slide into the groove 10, a part of the slidable device 1 may be stored into the dodging area 220. At this time, a gap between the slidable device 1 and a wall face of the dodging area 220, and a gap between the slidable device 1 and a wall face of the groove 10 (which is on a same side with the gap between the slidable device 1 and the wall face of the dodging area 220) may be misaligned, so that risks of water vapor, dust, and the like outside the mobile terminal 100 entering the groove 10 may be reduced, and the service life of the mobile terminal 100 may be improved.

The back cover 50 may include a back case 51 and a second display screen 52. The back case 51 may be fixed on the middle frame 4. The second display screen 52 may be fixed on a side of the back case 52 away from the middle frame 4. The rear side face 104 may be formed on a side of the second display screen 52 away from the back case 51. The second display screen 52 may be used as another display screen of the mobile terminal 100, such that the mobile terminal 100 may have a double-sided display screen. Both the first display screen 21 and the second display screen 52 may have touch and display functions.

In other embodiments, it may not arrange the second display screen 52 on the back cover 50, it may arrange a glass cover plate on the back cover 50. The glass cover may be fixed on the back case 51, so that the back cover of the mobile terminal 100 may have a transparent texture to improve the user experience. The back cover 50 may also be an integrally formed metal back cover, so as to obtain a metallic texture.

Figure 8:
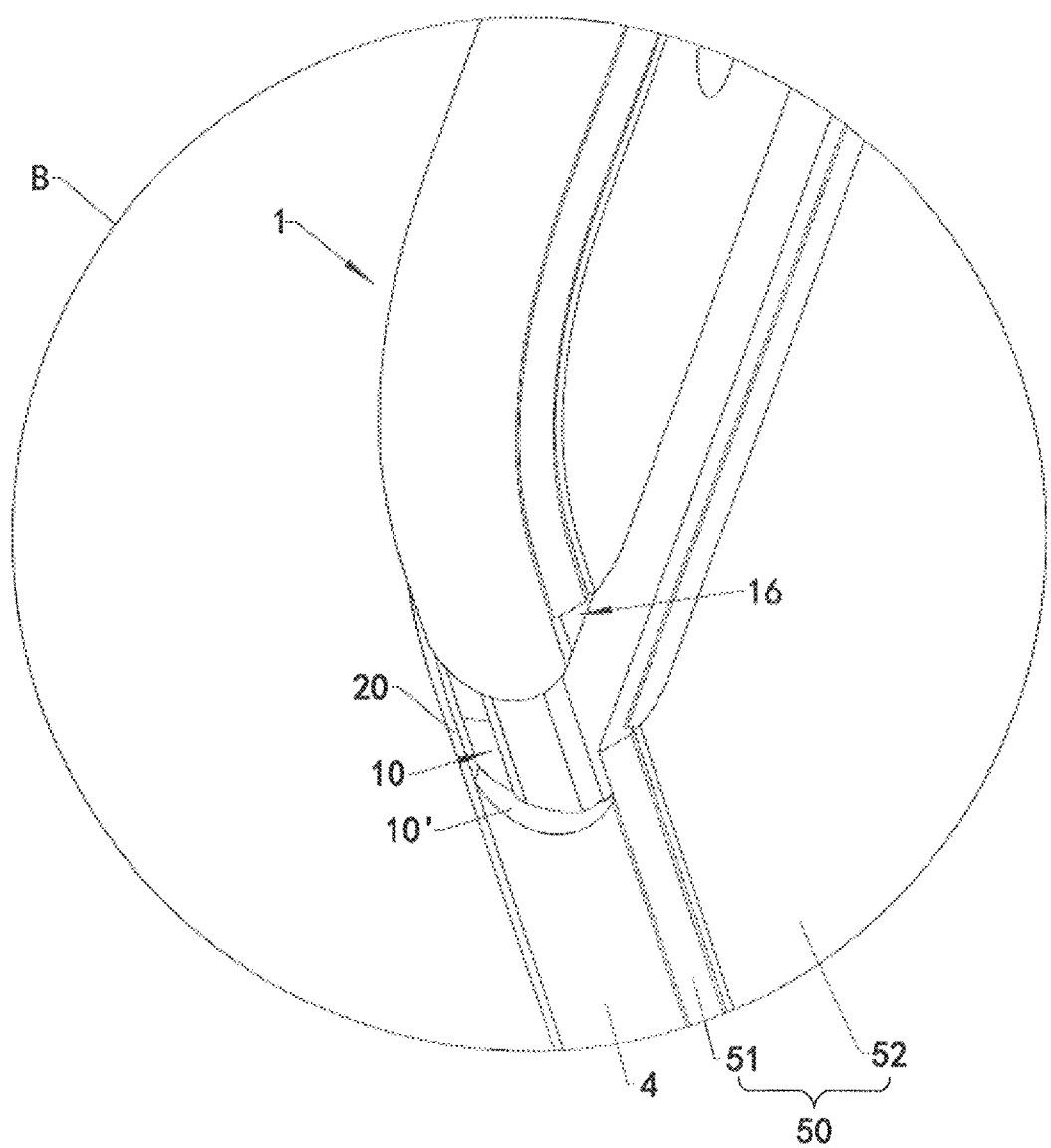
FIG. 8 is an enlarged view of structure B in FIG. 4.

Referring to FIG. 8, a recessed area 16 may be defined in the slidable device 1. The recessed area may be recessed from the rear side wall 14 toward the front side wall 13. When the slidable device 1 slides into the groove 10, a part of the back cover 50 may be inside the recessed area 16. By defining the recessed area 16, the slidable device 1 may obtain a limit of the back cover 50 during an engagement with the back cover 50. The slidable device 1 may be aligned accurately, so that the slidable device 1 may be prevented from excessively penetrating the groove 10, and an impact damage to devices located inside the mobile terminal 100 may be avoided. At this same time, a wall face of the recessed area 16 and a position of the back cover 50 corresponding to the recessed area 16 may be formed as two faces intersecting each other, so that risks of water vapor, dust, and the like outside the mobile terminal 100 entering the groove 10 may be reduced, and the service life of the mobile terminal 100 may be improved.

Referring to FIGS. 9 to 12, in an embodiment, the top of the middle frame 4 may have a partition wall 43. The partition wall 43 may be configured to isolate a storage cavity 44 from the groove 10 inside the mobile terminal 100. A through hole 430 may be defined on the partition wall 43, and the storage cavity 44 and the groove 10 may extend to each other via the through hole 430. A number of the through hole 430 may be plural. The partition wall 43 may be configured to prevent dust in an external environment from entering the storage cavity 44. In other embodiments, the storage cavity 44 and the groove 10 may also directly extend to each other without any partition wall between the storage cavity 44 and the groove 10.

Referring to FIGS. 9 to 12, in an embodiment, the mobile terminal 100 may include a mother board 51 stored into the storage cavity 44, a processor 52 arranged on the mother board 51, and a battery (not shown in figure) electrically coupled to the mother board 51. The first display screen 21 may be electrically and signally coupled to the mother board 51. The first camera 31, the second camera 32, the third camera 34, the flash lamp 34, the loudspeaker 35 and other functional devices in the slidable device 1 may be electrically and signally coupled to the mother board 51. The mobile terminal 100 may further include a connecting line 37 (such as a cable or a flexible circuit board). The connecting line 37 may be connected between the mother board 51 and the first camera 31, may be connected between the mother board 51 and the second camera 32, may be connected between the mother board 51 and the third camera 34, may be connected between the mother board 51 and the flash lamp 34, may be connected between the mother board 51 and the loudspeaker 35, and may be connected between the mother board 51 and other functional devices. The connecting line 37 may extend into the storage cavity 44 via one of the through holes 430.

Figure 9:
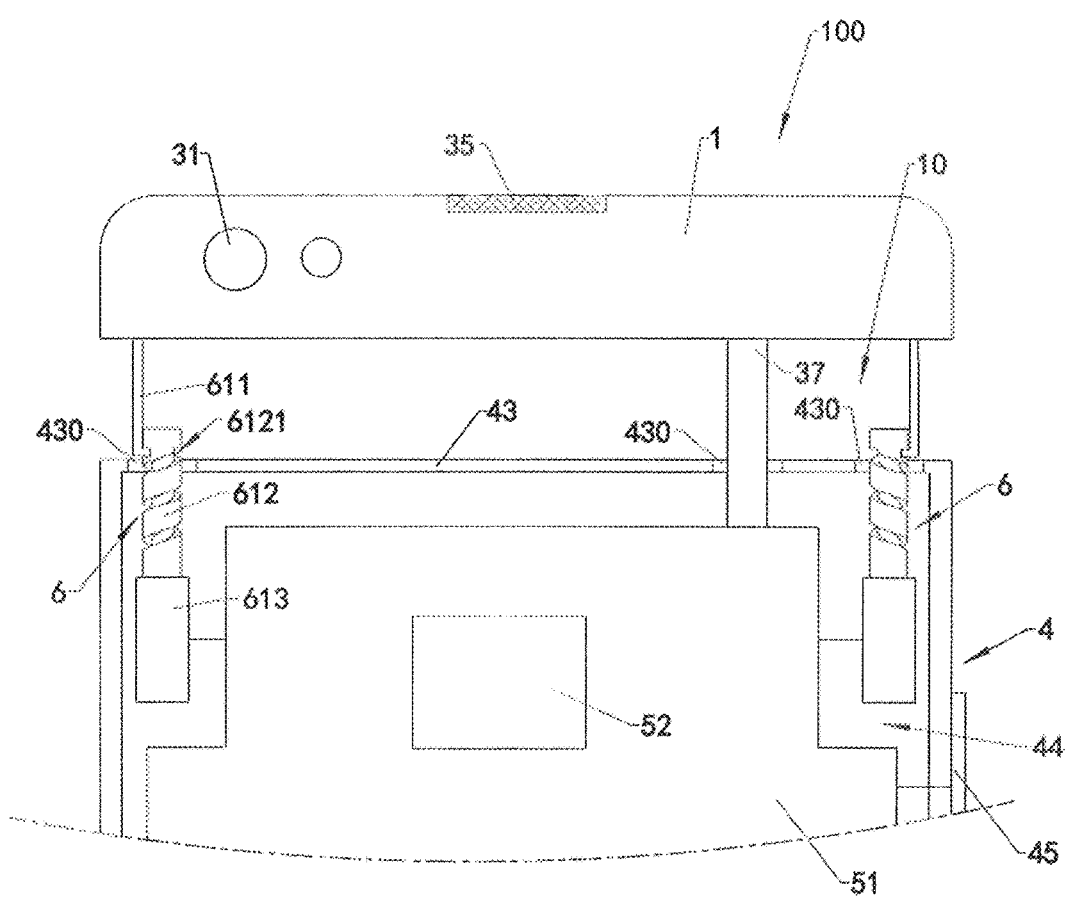
FIG. 9 is a partial view of FIG. 2.
Figure 10:
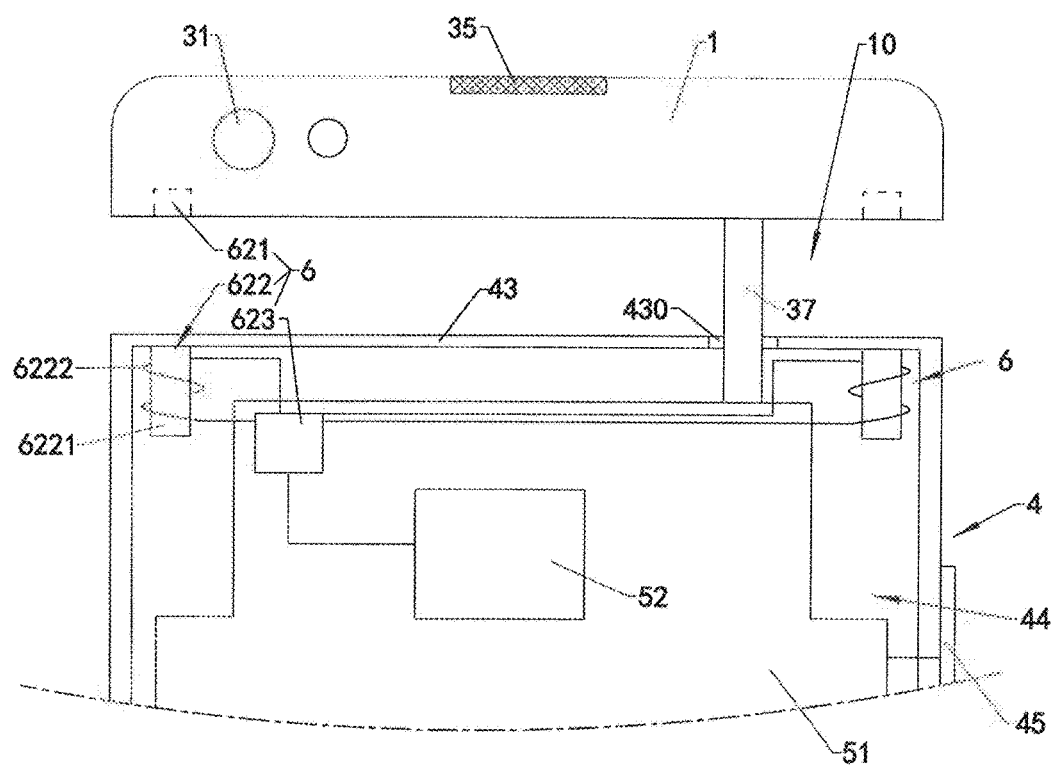
FIG. 10 is a partial view of a mobile terminal in accordance with another embodiment in the present disclosure.

Referring to FIG. 9 to FIG. 10, in an embodiment, the mobile terminal 100 may further include a driving assembly 6. A part of the driving assembly 6 may be fixed on the slidable device 1, and a part of the driving assembly 6 may be stored into the middle frame 4, i.e., a part of the driving assembly 6 may be stored into the storage cavity 44. The driving assembly 6 may be configured to drive the slidable device 1 to slide out of the groove 10 or into the groove 10. The drive assembly 6 may be electrically and signally coupled to the mother board 51. The drive assembly 6 may be operated under a control by the mother board 51.

The drive assembly 6 may have a number of sets, and the number of sets of the drive assemblies 6 may be spaced apart to drive the slidable device 1 more smoothly. For example, the number of the drive assemblies 6 may be two.

The drive assembly 6 may have multiple driving modes.

Referring to FIG. 9, in an embodiment, the driving assembly 6 may include a sliding block 611, a screw rod 612, and a motor 613. The sliding block 611 may be fixed on the slidable device 1. The screw rod 612 and the motor 613 may be stored into the middle frame 4. A spiral groove 6121 may be defined on an outer peripheral side of the screw rod 612. A part of the sliding block 611 may be embedded in the spiral groove 6121, so that the sliding block 611 may be slidably coupled to the screw rod 612. The sliding block 611 may be substantially a strip shape. One end of the sliding block 611 may be fixed to the slidable device 1, and the other end of the sliding block 611 may be embedded in the spiral groove 6121. The motor 613 may be configured to drive the screw rod 612 to rotate, so that the sliding block 611 may drive the slidable device 1 to slide. The motor 613 may be electrically coupled to the mother board 51. The processor 52 on the mother board 51 may control actions of the motor 613 (including a rotation direction, a rotation speed, a rotation angle, and the like).

The motor 613 may be stored into the storage cavity 44. The screw rod 612 may be stored into the storage cavity 44. One end of the sliding block 611 may enter the storage cavity 44 via the through hole 430 on the partition wall 43 to couple the screw rod 612. In an embodiment, a part of the screw rod 612 may also be extended out of the storage cavity 44 via the through hole 430 to increase a stroke of the slidable device 1. A storage slot may be defined in the slidable device 1 corresponding to the screw rod 612. The storage slot may be configured to store a part of the screw rod 612 when the slidable device 1 slides into the groove 10.

When the motor 613 drives the screw rod 612 to rotate in a first direction, the sliding block 611 may drive the slidable device 1 to slide away from the storage cavity under the driving by the screw rod 612, thereby the slidable device 1 may slide out of the groove 10. When the motor 613 drives the screw rod 612 to rotate in a second direction opposite to the first direction, the sliding block 611 may drive the slidable device 1 to slide toward the storage cavity under the driving by the screw rod 612, thereby the slidable device 1 may slide into the groove 10.

Referring to FIG. 10, in an embodiment, the driving assembly 6 may include a magnet 621, an electromagnet 622, and a controller 623. The magnet may be fixed on the slidable device 1. The electromagnet 622 may be fixed in the middle frame 4. The controller 623 may be stored into the middle frame 4. The controller 623 may be configured to change a magnetic field generated by the electromagnet 622, so that the electromagnet 622 may attract or repel the magnet 621. The electromagnet 622 may include an iron block 6221 and a coil 6222 wound around outer peripheral walls of the iron block 6221. The coil 6222 may be electrically coupled to the controller 623. The controller 623 may change the magnetic field generated by the electromagnet 622 by controlling the current flow direction in the coil 6222.

The controller 623 may be stored into the storage cavity 44. The controller 623 may be fixed to the mother board 51. The controller 623 may be electrically coupled to the processor 52. The electromagnet 622 may be fixed on the partition wall 43. The electromagnet 622 may be fixed on a side of the partition wall 43 facing the storage cavity 44 or away from the storage cavity 44.

When a magnetic pole in an end of the electromagnet 622 facing the magnet 621 and a magnetic pole in an end of the magnet 621 away from the slidable device 1, are same, the electromagnet 622 may repel the magnet 621, and the slidable device 1 may slide out of the groove 10. When the magnetic pole in the end of the electromagnet 622 facing the magnet 621 and the magnetic pole in the end of the magnet 621 away from the slidable device 1, are different, the electromagnet 622 may attract the magnet 621, and the slidable device 1 may slide into the groove 10.

Figure 11:
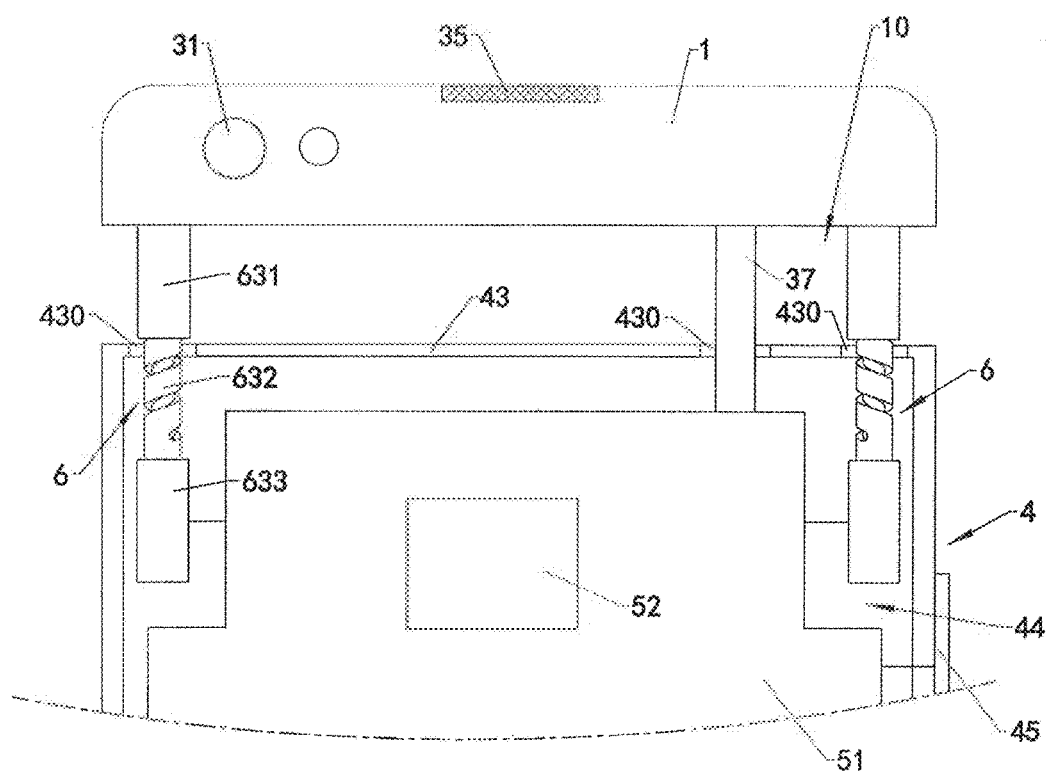
FIG. 11 is a partial view of a mobile terminal in accordance with another embodiment in the present disclosure.

Referring to FIG. 11, in an embodiment, the driving assembly 6 may include a sleeve 631, a transmission rod 623, and a motor 633. The sleeve may be fixed on the slidable device 1. The transmission rod 632 and the motor 633 may be stored into the middle frame 4. The sleeve 631 may be sleeved outside the transmission rod 632 and screwed to the transmission rod 632. The sleeve 631 may rotate relative to the transmission rod 632 and may move relative to the middle frame 4. The motor 633 may be configured to drive the transmission rod 632 to rotate, so that the sleeve 631 may drive the slidable device 1 to slide. The motor 633 may be electrically coupled to the mother board 51. The processor 52 on the mother board 51 may control actions of the motor 633 (including a rotation direction, a rotation speed, a rotation angle, and the like).

The motor 633 may be stored into the storage cavity 44. The transmission rod 632 may be stored into the storage cavity 44. One end of the sleeve 631 may enter the storage cavity 44 via the through hole 430 on the partition wall 43 to couple the transmission rod 632. In an embodiment, a part of the transmission rod 632 may also be extended out of the storage cavity 44 via the through hole 430 to increase a stroke of the slidable device 1. A storage slot may be defined in the slidable device 1 corresponding to the transmission rod 632. The storage slot may be configured to store a part of the transmission rod 632 when the slidable device 1 slides into the groove 10.

When the motor 633 drives the transmission rod 632 to rotate in a third direction, the sleeve 631 may drive the slidable device 1 to slide away from the storage cavity under the driving by the transmission rod 632, thereby the slidable device 1 may slide out of the groove 10. When the motor 633 drives the transmission rod 632 to rotate in a fourth direction opposite to the third direction, the sleeve 631 may drive the slidable device 1 to slide toward the storage cavity under the driving by the transmission rod 632, thereby the slidable device 1 may slide into the groove 10.

Figure 12:
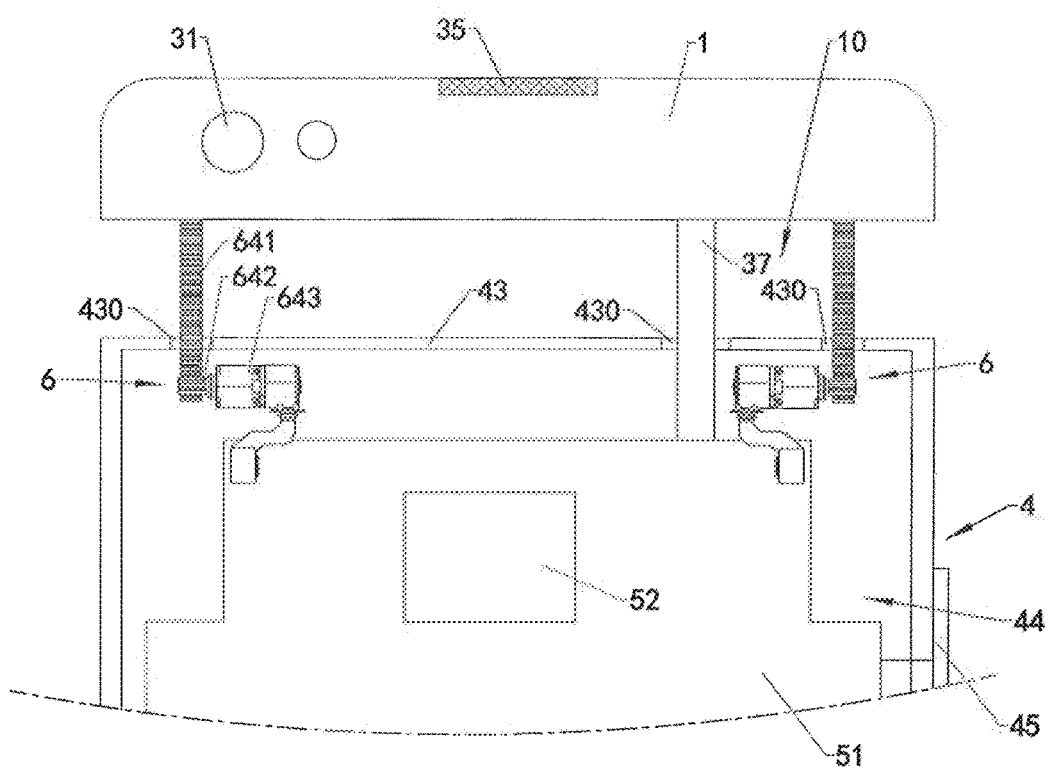
FIG. 12 is a partial view of a mobile terminal in accordance with another embodiment in the present disclosure.

Referring to FIG. 12, in an embodiment, the driving assembly 6 may include a rack 641, a gear 642, and a motor 643. The rack 641 may be fixed on the slidable device 1. The gear 642 and the motor 643 may be stored into the middle frame 4. Teeth of the gear 642 and teeth of the rack 641 may be engaged. One end of the rack 641 may be fixed to the slidable device 1, and the other end of the rack 641 may extend into the storage cavity 44 via the through hole 430 on the partition wall 43. The motor 643 may be stored into the storage cavity 44. The motor 643 may be configured to drive the gear 642 to rotate, so that the rack 641 may drive the slidable device 1 to slide. The motor 643 may be electrically coupled to the mother board 51. The processor 52 on the mother board 51 may control actions of the motor 643 (including a rotation direction, a rotation speed, a rotation angle, and the like).

When the motor 643 drives the gear 642 to rotate in a fifth direction, the rack 641 may drive the slidable device 1 to slide away from the storage cavity under the driving by the gear 642, thereby the slidable device 1 may slide out of the groove 10. When the motor 643 drives the gear 642 to rotate in a sixth direction opposite to the fifth direction, the rack 641 may drive the slidable device 1 to slide toward the storage cavity under the driving by the gear 642, thereby the slidable device 1 may slide into the groove 10.

Referring to FIG. 3 and FIGS. 9 to 12, in an embodiment, a trigger button 45 may be arranged on the right side face 102. The trigger button 45 may be arranged on the middle frame 4. The trigger button 45 may be electrically and signally coupled to the mother board 51. When a user presses or touches the trigger button 45, the trigger button 45 may send a trigger signal to the processor 52 on the mother board 51. The processor 52 may control the driving assembly 6, so that the slidable device 1 may be slide out of the groove 10 or into the groove 10 under the driving by the drive assembly 6. In other embodiments, the trigger button 45 may also be arranged on the left side face 101. The trigger button 45 may be arranged on both the left side face 101 and the right side face 102.

In other embodiments, the trigger button 45 may be a icon arranged on the first display screen 21 or the second display screen 52. When the icon is touched, the icon may send a trigger signal to the processor 52 on the mother board on 51. When the processor 52 receives the trigger signal, and the processor 52 may control the driving assembly 6 to drive the slidable device 1 to slide.

For example, the trigger button 45 may be a start shooting button and an end shooting button arranged on the first display screen 21 or the second display screen 52. When the start shooting button is touched, the start shooting button may send a first trigger signal to the processor 52 on the mother board 51. When the processor 52 receives the first trigger signal, the processor 52 may control the driving assembly 6 to drive the slidable device 1 sliding out of the groove 10, so that the first camera 31 may shoot under a shooting signal. When the end shooting button is touched, the end shooting button may send a second trigger signal to the processor 52 on the mother board 51. When the processor 52 receives the second trigger signal, the processor 52 may control the driving assembly 6 to drive the slidable device 1 sliding into the groove 10.

For example, the trigger button 45 may be a telephone answering button and an telephone hanging up button arranged on the first display screen 21 or the second display screen 52. When the telephone answering button is touched, the telephone answering button may send a third trigger signal to the processor 52 on the mother board 51. When the processor 52 receives the third trigger signal, the processor 52 may control the driving assembly 6 to drive the slidable device 1 to slide with the loudspeaker sliding out of the groove 10. When the telephone hanging up button is touched, the telephone hanging up button may send a fourth trigger signal to the processor 52 on the mother board 51. When the processor 52 receives the fourth trigger signal, the processor 52 may control the driving assembly 6 to drive the slidable device 1 sliding into the groove 10.

Referring to FIGS. 1 to 9, in an embodiment, a mobile terminal 100 may include: a front shell 103 having a first top edge; a back shell 104 opposite to the front shell 103 and having a second top edge lower than the first top edge; a screen 21 mounted on the front shell 103; a frame 4 including a pair of spaced and parallel wall 101 and wall 102 engaged with the front shell 103 and the back shell 104 to enclose a chamber 51. Each of the wall 101 and the wall 1, 102 having a top may be lower than the first and second top edges. A partition wall 43 may be connected the wall 101 and the wall 102. The front shell 103, the back shell 104 and the partition wall 43 may cooperatively define a storage space 10. A slidable device 1 may have a front 13 and a rear 14 opposite to the front 13. The slidable device 1 may include a first camera 31 on the front 13 and a second camera 32 on the rear 14. The slidable device 1 may be configured to move between a first position at which the slidable device 1 extends out of the storage space 10 and a second position at which the slidable device 1 partly retracts into the storage space 10. When the slidable device 1 is at the first position, the first camera 31 and the second camera 32 may be exposed out of the storage space 10. When the slidable device 1 is at the second position, the first camera 31 may be received in the storage space 10 and the rear 14 with the second camera 32 may be exposed, and the rear 14 of the slidable device 1 may engage with the second top edge of the back shell 104. The screen 21 may have a display area. When the slidable device 1 is at the second position, the first camera 31 may be covered by the display area.

Referring to FIGS. 1 to 9, in an embodiment, an electronic apparatus 100 may include: a front shell 103; a back shell 104 including an upper portion and a lower portion; a screen 21 mounted on the front shell 103; a frame 4 including a pair of spaced and parallel wall 101 and wall 102 engaged with the front shell 103 and the lower portion of the back shell 104 to enclose a chamber 51. Each of the wall 101 and the wall 102 having a top may be lower than tops of the front shell 103 and the lower portion of the back shell 104. A partition wall 43 may be connected the wall 101 and the wall 102. The front shell 103, the lower portion and the partition wall 43 cooperatively define a storage space 10. A slidable device 1 may have a front 13 and a rear 14 opposite to the front 13. The upper portion of the back shell 104 may be mounted on the rear 14 of the slidable device 1. The slidable device 1 may include a first camera 31 on the front 13 and a second camera 32 on upper portion. The slidable device 1 may be configured to move between a first position at which the slidable device 1 extends out of the storage space 10 and a second position at which the slidable device 1 partly retracts into the storage space 10 with the rear 14 exposed. When the slidable device 1 is at the first position, the first camera 31 and the second camera 32 may be exposed out of the storage space 10. When the slidable device 1 is at the second position, the first camera 31 may be received in the storage space 10 and the second camera 32 may be exposed, and the upper portion may engage with the lower portion of the back shell 104. The top of each of the wall 101 and the wall 102 may be concaved. The slidable device 1 may include a pair of opposite sidewall 13 and sidewall 14. Each of the sidewall 13 and the sidewall 14 may have a bottom which is convex. When the slidable device 1 is at the second position, the bottom of each of the sidewall 13 and the sidewall 14 may engage with the top of each of the wall 101 and the wall 102.

It is understood that the descriptions above are only embodiments of the present disclosure. It is not intended to limit the scope of the present disclosure. Any equivalent transformation in structure and/or in scheme referring to the instruction and the accompanying drawings of the present disclosure, and direct or indirect application in other related technical field, are included within the scope of the present disclosure.

What is claimed is:

1. A mobile terminal comprising:
  a right side face;
  a left side face;
  a front side face;
  a rear side face;
  a top side face; and
  a bottom side face;
  wherein
    the left side face is arranged opposite to the right side face;
    the front side face is arranged opposite to the rear side face;
    the front side face is coupled between the left side face and the right side face;
    the rear side face is coupled between the left side face and the right side face;
    the top side face is arranged opposite to the bottom side face;
    the top side face is coupled between the left side face and the right side face, and is coupled between the front side face and the rear side face; and
    the bottom side face is coupled between the left side face and the right side face;
  wherein
    a groove is defined in the mobile terminal; the groove is recessed from the top side face toward the bottom side face, the groove penetrates the left side face and the right side face, and the groove extends to the rear side face;
  a slidable device configured to slide out of the groove or into the groove, and comprising a left side wall, a right side wall, a front side wall, a rear side wall, and a top side wall;
  wherein
    the left side wall is arranged opposite to the right side wall;
    the front side wall is coupled between the left side wall and the right side wall;
    the rear side wall is coupled between the left side wall and the right side wall; and
    the top side wall is coupled between the left side wall and the right side wall, and is coupled between the front side wall and the rear side wall;
  a first display screen;
  a first camera; and
  a second camera;
  wherein
    the first display screen is arranged on the front side face, and the first camera and the second camera is arranged on the slidable device;
    an orientation of an image capturing face of the first camera is consistent with an orientation of the front side wall; and
    an orientation of an image capturing face of the second camera is consistent with an orientation of the rear side wall;
  when the slidable device slides into the groove with the first camera and the second camera, the top side wall becomes a part of the top side face; the left side wall becomes a part of the left side face; the right side wall becomes a part of the right side face; and the rear side wall becomes a part of the rear side face; the image capturing face of the first camera is blocked, and the image capturing face of the second camera is exposed;
  when the slidable device slides out of the groove with the first camera and the second camera, the image capturing face of the first camera and the image capturing face of the second camera are both exposed.

2. The mobile terminal according to claim 1, wherein the mobile terminal further comprises a third camera arranged on the slidable device; and
  an orientation of an image capturing face of the third camera is consistent with an orientation of the rear side wall.

3. The mobile terminal according to claim 1, wherein the mobile terminal further comprises a loudspeaker arranged on the slidable device, and the loudspeaker is sounded through the front side wall.

4. The mobile terminal according to claim 1, wherein the mobile terminal comprises a display module, a middle frame, and a back cover which are sequentially stacked;
  a top of the middle frame is recessed relative to a top of the display module and a top of the back cover, so that the display module, the middle frame, and the back cover collectively surround to define the groove.

5. The mobile terminal according to claim 4, wherein a face of the display module away from the middle frame is the front side face;
  a face of the back cover away from the middle frame is the rear side face;
  a left side face of the display module, a left side face of the middle frame, and a left side face of the back cover are continuous to form the left side face of the mobile terminal;
  a right side face of the display module, a right side face of the middle frame, and a right side face of the back cover are continuous to form the right side face of the mobile terminal;
  a bottom side face of the display module, a bottom side face of the middle frame, and a bottom side face of the back cover are continuous to form the bottom side face of the mobile terminal;
  when the slidable device slides into the groove, a top side face of the display module and a top side face of the slidable device are continuous to form the top side face of the mobile terminal.

6. The mobile terminal according to claim 5, wherein the left side face of the mobile terminal is a curved face; the right side face of the mobile terminal is a curved face; the bottom side face of the mobile terminal is a curved face; and
  the top side face of the mobile terminal is a curved face.

7. The mobile terminal according to claim 4, wherein an end of the left side face of the mobile terminal away from the top side face of the mobile terminal is curved;
  an end of the right side face of the mobile terminal away from the top side face of the mobile terminal is curved;

a bottom wall of the groove is formed at a top end of the middle frame, and both ends of the bottom wall of the groove are curved.

8. The mobile terminal according to claim 4, wherein the display module comprises a front case and the first display screen;
the front case is fixed on the middle frame, and the first display screen is fixed on a side of the front case away from the middle frame.

9. The mobile terminal according to claim 8, wherein a dodging area is defined on a side of the front case facing the middle frame, and the dodging area extends to the groove;
when the slidable device slides into the groove, a part of the slidable device is stored into the dodging area.

10. The mobile terminal according to claim 4, wherein the back cover comprises a back case and a second display screen;
the back case is fixed on the middle frame, and the second display screen is fixed on a side of the back case away from the middle frame.

11. The mobile terminal according to claim 4, wherein a recessed area is defined on the slidable device, and the recessed area is recessed from the rear side wall toward the front side wall;
when the slidable device slides into the groove, a part of the back cover is stored into the recessed area.

12. The mobile terminal according to claim 4, wherein the mobile terminal further comprises a driving assembly;
a first end of the driving assembly is partially fixed on the slidable device, and a second end of the driving assembly is partially stored into the middle frame; and
the driving assembly is configured to drive the slidable device to slide out of the groove or into the groove.

13. The mobile terminal according to claim 12, wherein the driving assembly comprises a sliding block, a screw rod, and a motor;
the sliding block is fixed on the slidable device;
the screw rod and the motor are stored into the middle frame;
a spiral groove is defined on an outer peripheral side of the screw rod;
a part of the sliding block is embedded in the spiral groove, so that the sliding block is slidably coupled to the screw rod; and
the motor is configured to drive the screw rod to rotate, so that the sliding block drives the slidable device to slide.

14. The mobile terminal according to claim 12, wherein the driving assembly comprises a magnet, an electromagnet, and a controller;
the magnet is fixed on the slidable device;
the electromagnet is fixed in the middle frame;
the controller is stored into the middle frame; and
the controller is configured to change a magnetic field generated by the electromagnet, so that the electromagnet attracts or repels the magnet, to drive the slidable device to slide.

15. The mobile terminal according to claim 12, wherein the driving assembly comprises a sleeve, a transmission rod, and a motor;
the sleeve is fixed on the slidable device;
the transmission rod and the motor are stored into the middle frame;
the sleeve is sleeved outside the transmission rod and screwed to the transmission rod; and
the motor is configured to drive the transmission rod to rotate, so that the sleeve drives the slidable device to slide.

16. The mobile terminal according to claim 12, wherein the driving assembly comprises a rack, a gear, and a motor,
the rack is fixed on the slidable device;
the gear and the motor are stored into the middle frame;
teeth of the gear and teeth of the rack are engaged;
the motor is configured to drive the gear to rotate, so that the rack drives the slidable device to slide.

17. A mobile terminal, comprising:
a front shell having a first top edge;
a back shell opposite to the front shell and having a second top edge lower than the first top edge;
a screen mounted on the front shell;
a frame comprising a pair of spaced and parallel walls engaged with the front and back shells to enclose a chamber, each of the walls having a top lower than the first and second top edges, a partition wall connected the walls, wherein the front shell, the back shell and the partition wall cooperatively define a storage space;
a slidable device having a front and a rear opposite to the front, the slidable device comprising a first camera on the front and a second camera on the rear, the slidable device configured to move between a first position at which the slidable device extends out of the storage space and a second position at which the slidable device partly retracts into the storage space;
when the slidable device is at the first position, the first and second cameras are exposed out of the storage space;
when the slidable device is at the second position, the first camera is received in the storage space and the rear with the second camera is exposed, and the rear of the slidable device engages with the second top edge of the back shell.

18. The mobile terminal according to claim 17, wherein the screen has a display area;
when the slidable device is at the second position, the first camera is covered by the display area.

19. An electronic apparatus, comprising:
a front shell;
a back shell comprising an upper portion and a lower portion;
a screen mounted on the front shell;
a frame comprising a pair of spaced and parallel walls engaged with the front shell and the lower portion of the back shell to enclose a chamber, each of the walls having a top lower than tops of the front shell and the lower portion of the back shell, a partition wall connected the walls, wherein the front shell, the lower portion and the partition wall cooperatively define a storage space;
a slidable device having a front and a rear opposite to the front, the upper portion of the back shell mounted on the rear of the slidable device, the slidable device comprising a first camera on the front and a second camera on upper portion, the slidable device configured to move between a first position at which the slidable device extends out of the storage space and a second position at which the slidable device partly retracts into the storage space with the rear exposed;
when the slidable device is at the first position, the first and second cameras are exposed out of the storage space;

when the slidable device is at the second position, the first camera is received in the storage space and the second camera is exposed, and the upper portion engages with the lower portion of the back shell.

20. The electronic apparatus according to claim 19, wherein the top of each of the walls is concaved; the slidable device comprises a pair of opposite sidewalls, each of the sidewalls has a bottom which is convex;

when the slidable device is at the second position, the bottom of each of the sidewalls engage with the top of each of the walls.

* * * * *